June 1, 1971 G. A. GUTER ET AL 3,582,485
WATER PURIFICATION
Filed April 16, 1968

GERALD A. GUTER
LESLIE M. TINT
INVENTORS

BY Max Gilden
ATTORNEY

United States Patent Office 3,582,485
Patented June 1, 1971

3,582,485
WATER PURIFICATION
Gerald A. Guter, San Clemente, and Leslie M. Tint, La Mirada, Calif., assignors to McDonnell Douglas Corporation, Santa Monica, Calif.
Filed Apr. 16, 1968, Ser. No. 721,623
Int. Cl. B01k 3/00; C02b 1/00, 1/82
U.S. Cl. 204—149
11 Claims

ABSTRACT OF THE DISCLOSURE

Process for continuous catalyzed electrochemical decomposition of soluble organics in water, particularly of urea in urine, in a direct current electrolysis cell having an anode and a cathode in a single compartment. The water or urine to be purified is flowed into the cell, and the concentration of $Cl^-$ ion is adjusted as desired within a certain range. A catalyst in the form of $Br^-$ ion is added and voltage is applied across the electrodes causing oxidation of the $Br^-$ ion to $Br_2$ and the $Cl^-$ ion to $Cl_2$ which in turn oxidize the organic material in the water, for example urea in urine, to $N_2$ and $CO_2$ gases, and are at the same time reduced back to the $Br^-$ and $Cl^-$ ions respectively. This cycle operates continuously until all of the organic material is oxidized. The process is useful for purification of urine, secondary effluent waste water, purification of swimming pool water and drinking water, etc.

---

This invention relates to electrochemical purification of water by the removal of soluble organic material from waste water, and particularly to the removal of urea from urine, to produce substantially pure organic-free water, and is especially concerned with a simple electrolytic procedure for this purpose, having the advantages of low electrical power requirements, speed of reaction and improved efficiency of reaction.

In recent years there have been numerous methods suggested for the purification of water containing low concentrations of soluble organics, e.g., lightly polluted streams and lakes as sources of drinking water, swimming pool water, etc. Most of these methods rely on the addition of bleach, NaOCl, usually added directly to the water to be purified. Other methods have included electrochemical processes using an electrolysis cell and a chloride such as sodium chloride as the electrolyte. See, e.g., U.S. Pats. 1,200,165 and 2,873,236.

The above described method of adding bleach to the water is not suitable for the purification of waste water and especially for the removal of urea from urine. Purification of waste water, especially of urine, by the method of electrolysis is impractical since the large concentration of organic material, especially of urea, requires extended reaction periods due to inefficiency of current and electrolyte materials resulting in prohibitive high cost.

In U.S. Pat. 2,882,210, the purification of swimming pool water is effected by utilizing an electrolytic diaphragm cell whereby the cell is divided into anode and cathode compartments. An electrolyte material, i.e., chloride and a bromide, are added as needed to the water. The electrolysis of the aqueous solution of sodium bromide and sodium chloride is carried out in the two separate compartments, one containing the anode and in which an acid solution is formed, and the other containing the cathode and in which an alkaline solution is formed. After oxidation of the $Br^-$ and $Cl^-$ ions, the acidic contents of the anode compartment are removed to a place separate from the cell where the halogen is held in contact with the water for a substantial period of time to effect sterilization action. The alkaline water formed in the cathode compartment is mixed with the acidic purified water to adjust the pH. Additional electrolyte material is added to new water coming into the electrolysis cell and the process is repeated until the entire water to be purified has been passed through the electrolysis cell.

The above method is also not suitable for purification of waste water and especially of urine since the removal of the high concentration of soluble organics, especially of urea, by this method would be very inefficient and costly due to the long reaction periods required and the consumption of large amounts of electrolyte materials. Moreover, these electrolyte materials would contaminate the final product requiring subsequent removal before such water would be potable or otherwise usable.

Another U.S. Pat. 3,268,441, discloses a combination of steps to purify urine including precipitation of certain of the dissolved material as salts, filtering to remove suspended material, treating with activated charcoal to further remove impurities, and passing the resulting fluid through the desalting chambers of an ion-exchange electrodialysis unit to remove dissolved salts.

It is clear that this last method is complicated, and costly because of the numerous steps involved.

The purification by electrolysis of urine which contains approximately 30 gm./liter of urea as the main contaminant proceeds, it is believed, according to the following series of equations using $Cl^-$ as the electrolyte:

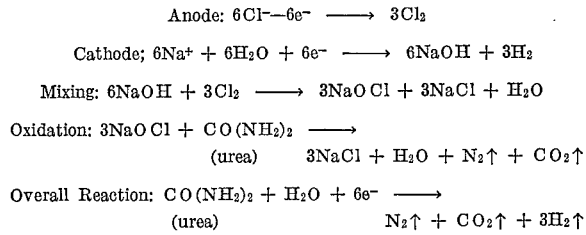

From the equations shown above, it is seen that the postulated reaction mechanism requires 6 Faradays per mole of urea removed.

Considering the free energy of formation, the electrolytic urea oxidation to carbon dioxide, nitrogen and hydrogen requires 0.215 watt-hours per gram of urea, or since urea constitutes 90–95% of urine, 2.93 watt-hours is required to oxidize one pound of urine having a urea concentration of about 30 gm./liter. It is observed experimentally, however, using chloride as the electrolyte, that at an applied voltage of 5.37 v., the oxidation of each pound of urine requires 210 watt-hours. This is about 70 times greater than the theoretical minimum of 2.93 watt-hours per lb. of urine.

It now surprisingly has been discovered according to the method of the invention which includes the use of a $Br^-$ ion catalyst with $Cl^-$ ion electrolyte in an electrolysis cell, that less than 4 Faradays is consumed per mole of urea and the power requirements are only 1.43 watt-hours per gm. of urea oxidized.

In carrying out the method of the invention the urine containing urea or water containing dissolved organic material is flowed into an electrolysis cell having an anode and a cathode and into contact with both electrodes in a single electrode compartment. The concentration of $Cl^-$ ion in the urine or water solution is adjusted to one in the range of about .010% to about 10%, and $Br^-$ ion catalyst is added to the urine or water solution to give a concentration of one in the range of about .001% to about 10%. A voltage, for example, of the order of 2 volts is applied to the electrodes for a time sufficient to allow complete electrochemical decomposition of the urea or other water soluble organic material in the water.

Accordingly, by use of the method of the invention the number of Faradays consumed per mole of urea oxidized is reduced by ⅓ and surprisingly is less than the theoretically required 6 Faradays. The power reduction is even more dramatic; not only is the 1.43 watt-hours per gm. of urea less than half of the theoretically required amount but is about 147% less than actually required using only $Cl^-$ ion without the $Br^-$ ion catalyst. Thus, significantly reduced power requirements are provided over that of the prior art.

The process, moreover, is continuous since the $Br^-$ and $Cl^-$ ions are continuously regenerated so that additional electrolyte material does not need to be added periodically as required by the prior art methods, and small concentrations can be used which alleviates salt removal problems. In fact, by employment of the process of the invention it is possible to produce potable water, which is considered by general standards as water having a salt concentration of less than about 500 p.p.m. (parts per million), from urine. The overall reaction scheme for the continuous generation of $Br^-$ and $Cl^-$ is shown below:

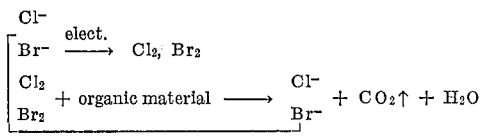

Not only does the invention provide reduced power requirements and economy and efficiency of expendable materials as compared with the prior art methods, but also, considerable reduction in the reaction time for purification because of the employment of the $Br^-$ ion catalyst is realized. Experiments showed that the catalyzed reaction according to the invention was faster and more complete than the uncatalyzed reaction. For example, employment of the invention process to purify 0.22 lb. of urine using the $Br^-$ ion catalyst was complete in 4 minutes. Without such $Br^-$ ion catalyst and in the presence of only $Cl^-$ ion the reaction was not complete after 40 minutes. Furthermore, the urea concentration in the final product was found to be less with the catalyzed reaction of the invention. Thus, the increased speed, efficiency and economy of materials result in a significant cost advantage over prior art methods.

Since the organic oxidizing material, that is chlorine and bromine formed in the electrolysis reaction, is in contact with both electrodes in the same compartment, a cleaning of such electrodes takes place allowing more efficient electrolysis at a higher current density to take place.

Following the invention process for substantially complete removal of organics, particularly urea from urine, the resulting substantially organic-free water can be subjected to demineralization if the dissolved salt content is substantially greater than about 500 p.p.m. which as previously noted, is the generally considered standard for maximum salt content for potable water. Any conventional demineralization procedure can be practiced for this purpose, such as electrodialysis, reverse osmosis or distillation.

The invention has wide application for the purification not only of urine but also of water containing dissolved organic contaminants such as waste water, and including secondary sewage effluent. Secondary sewage effluent results after sewage water is first treated in a primary process to remove floatables and to settle out the solids, and in a secondary process, usually biological, to reduce the dissolved organic content. The resulting secondary sewage effluent contains organic materials described as COD ("Chemical Oxygen Demand") which is tested by determining the amount of oxidizable organics in the water. These soluble organics can be removed by the process of the invention.

Other applications of the invention include the control of pollution and purification of swimming pool water.

Since the process removes the organic material, bacteria subsequently entering the purified water is deprived of food necessary for growth. The method of the invention can also be used to remove organic contaminants from the atmosphere including hydrocarbons, e.g., gasoline vapors, natural gas fumes, hydrogen sulfide, mercaptans. Removal of such organic contaminants purifies the air and at the same time removes the objectionable odors caused by these contaminants. In such application the gases are removed from the atmosphere by means of a gas scrubber which can be an aqueous solution containing halide salts. This solution is then electrolyzed according to the process of the invention to oxidize the organics. The invention can also be used to purify drinking water and to replace bleaching agents in wash water or virtually for any application where pure water is indicated.

The invention is further described below in connection with the accompanying drawings wherein.

Figure 1:
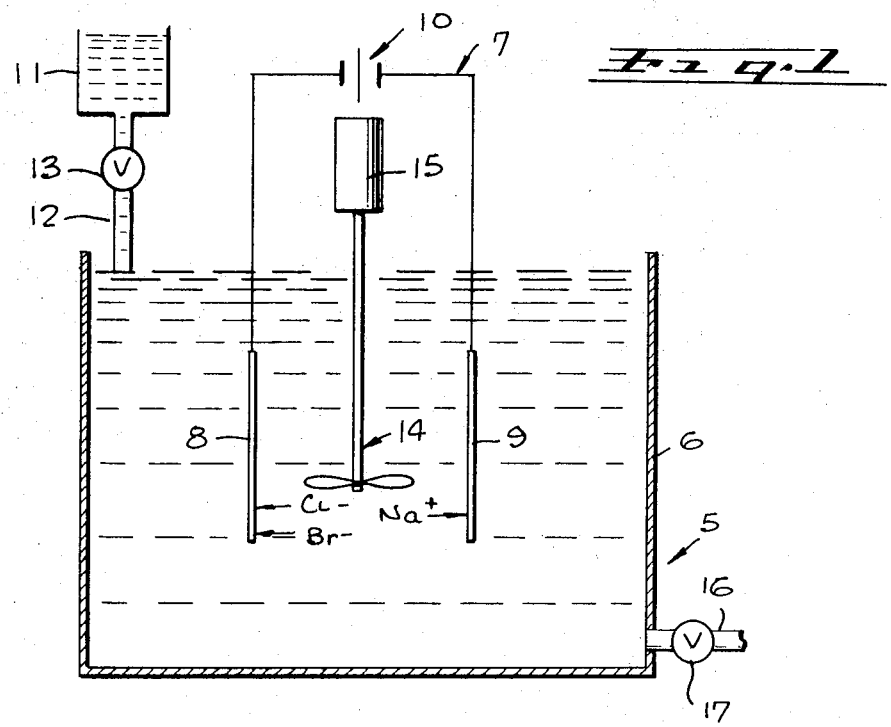
FIG. 1 is a schematic representation of an electrolysis cell which can be utilized in carrying out the invention.

Referring more particularly to FIG. 1, the cell 5 comprises a tank 6 which may be made of light gage iron, steel or other material not attacked by the electrolyte or decomposition materials of the urine or water. An electrode assembly shown generally at 7 and comprising an anode 8 and a cathode 9 is suspended within the tank 6 in spaced relation to the walls thereof. The anode and cathode are electrically connected to a source of direct current indicated at 10. Suspended above the tank 6 is a urine supply tank 11 communicating with the tank 6 by means of a pipe 12 having a valve 13 for regulating the flow of urine into the tank 6. The NaBr is conveniently added to the tank 6 in the form of an aqueous solution but alternatively can be added as the solid salt. A stirrer 14 extending into the interior of the tank 6 for purposes of mixing is driven by a motor 15. At the bottom of the tank 6 is a product outlet pipe 16 having a valve 17.

In operating the cell, the tank 6 is first filled with urine or other water to be purified from the urine supply tank 11. Sufficient NaCl is usually present in urine so that no additional $Cl^-$ ion need be added, otherwise $Cl^-$ is added as needed. The $Br^-$ ion catalyst is then added usually in the form of an aqueous NaBr solution. The stirring motor 15 is turned on and current is applied to the electrodes 8 and 9. As indicated in FIG. 1, the $Cl^-$ and $Br^-$ ions migrate toward the anode 8 while the $Na^+$ ion migrates toward the cathode. 9. The urea present in the urine as well as the other dissolved organic materials are oxidized to $CO_2$, $N_2$, and $H_2$ gases in the manner previously noted.

In lieu of the above described batch operation, the cell can be enclosed in the form of a cylindrical pressure type of electrolytic cell. As an essential feature, the cell has a single zone containing the anode and cathode electrodes, and the combination of a chloride and bromide catalyst. In such a system, a cleaning of the electrodes by the chlorine and bromine oxidizing agents occurs, and a highly efficient electrolysis at high current density results. Many variations of cells containing the above essential elements will be obvious to those skilled in the art.

The composition of the electrodes is not critical, and suitable materials for the anode include among others platinum or other inert material having metallic conductivity. Preferred materials are platinum, or dense carbon. The cathode, for example, can be of platinum, silver, nickel or nickel-plated iron or brass or in fact any metal not acted upon by any of the products of electrolysis. Preferred materials are platinum or dense carbon.

The concentration of the $Br^-$ ion catalyst can range from about .001% to about 10%, and is preferably in the range of about .01% to about 1%. Larger amounts can be added but there is no advantage. Preferably, the $Br^-$ ion is added in the form of a soluble salt of a member of the group consisting of alkali and alkaline earth metals, e.g., sodium, potassium, magnesium and calcium, and ammonium salts. Sodium bromide is preferred.

The concentration of $Cl^-$ ion should be in the range of about 0.10% to about 10% and preferably in the range of about 0.5% to about 3.5%. Larger amounts can be added but there is no advantage to this and may require subsequent salt removal. Preferably the $Cl^-$ ion is in the form of a water soluble salt of a member of the group consisting of the alkali and alkaline earth metals such as sodium, potassium, magnesium and calcium, and ammonium salts. The invention is not limited to the above mentioned water soluble salts and is meant to include any compound or ion such as hypochlorite ion which will generate the $Cl^-$ ion under the conditions of the reaction. Sodium chloride, it has been found, is almost always present in the indicated range in urine, secondary effluent, and swimming pool water. Therefore, in most cases no additional $Cl^-$ ion need be added.

The cell voltage should be within the range of about 1.6 volts to about 5 volts, and preferably about 1.6 to about 3 volts. For most efficient operation, the voltage should be about 1.9 to about 2 volts. When the voltage is below about 1.6 volts, the amperage is proportionately low and a longer period of operation is required to decompose the organic material in the water.

Reaction time depends on the amount of current, resistance, size of the cell and amount of urea or other dissolved organic material. Since the process is continuous, the reaction is allowed to proceed until all of the urea or other dissolved organic material has been decomposed. In any event, this point is determined empirically.

While not essential to the invention, stirring of the urine or water containing the dissolved organic material during electrolysis is highly desirable to provide uniform mixing, to speed the reaction, and also to aid the escape of gases, i.e., $CO_2$, $N_2$, from the purified water.

The invention will be more easily understood with reference to the following specific examples which are given to illustrate and disclose the invention and are not intended to be a limitation thereof.

EXAMPLE 1

An electrolysis cell of the type shown in FIG. 1 is filled with 0.060 liter of raw urine. The urine is tested and found to have a NaCl content of 14 gm./liter and a urea concentration of 5.92 gm./liter. NaBr is then added to the urine to give a concentration of 0.2% $Br^-$ ion. Stirring of the solution is begun and continued throughout the reaction. The cell is operated at a voltage of 1.9 volts for 160 minutes during which time the urea concentration is reduced from 5.92 to 0.14 gm./liter, which is equivalent to a consumption of 2.16 mg. of urea per minute. Each mole of urea consumed required 2.71 Faradays, and each lb. of urine purified required 31.4 watt-hours.

The resulting urea-free water is then subjected to demineralization to reduce the dissolved salt content to less than 500 p.p.m.

EXAMPLE 2

Two additional runs are made following the same procedure as in Example 1 except that the reaction time is increased to 265 minutes. The results of the two runs are presented in Table I below:

TABLE I

| Run | Urea Conc., initial-final, gm./l. | Rate of urea consumption, mg./min. | Faradays/ mole of urea consumed | Watt-hrs./ lb. of urine purified |
| --- | --- | --- | --- | --- |
| 2-A | 6.10-0.21 | 1.40 | 3.72 | 43.2 |
| 2-B | 5.31-0.10 | 1.07 | 2.53 | 29.3 |

For purposes of comparison with a procedure not in accordance with the invention, the procedure of Example 1 is repeated except that no bromide ion is added. Three runs are made and the results and reaction times are presented below in Table II.

TABLE II

| Run | Urea conc. initial-final gm./l. | Reaction time, min. | Rate of urea cons. mg./min. | Faradays/ mole of urea consumed | Watt-hrs./ lb. of urine purified |
| --- | --- | --- | --- | --- | --- |
| C | 3.49-3.46 | 160 | (¹) | (¹) | |
| D | 4.16-0.20 | 1400 | 0.178 | 9.60 | 111.0 |
| E | 5.40-0.193 | 1345 | 0.232 | 6.23 | 72.3 |

¹ Less than experimental error.

A comparison of the results of Example 1, and Table I of Example 2 where the $Br^-$ catalyst was used, with the results of Table II above where no $Br^-$ ion catalyst was used shows the effectiveness of the $Br^-$ ion catalyst. For example, in run 2-B only 265 minutes were required to reduce the urea concentration to 0.10 gm./l. whereas in run E without the $Br^-$ catalyst, 1345 minutes were required to reduce the urea concentration to 0.19 gm./l. Thus, the catalyzed reaction in a single cell according to the invention is faster and more efficient. A further advantage of the use of the $Br^-$ catalyst is the reduced power requirements as compared with the uncatalyzed reaction of Example 2. Referring to catalyzed run 2-B, 29.3 watt-hours were required per lb. of urea purified in the uncatalyzed run E. Also, the quantity of electricity required in the catalyzed run 2-B was 2.53 Faradays per mole of urea consumed, while in the uncatalyzed run 2-E, 6.23 Faradays per mole of urea consumed was required.

EXAMPLE 3

The procedure of Example 1 is repeated using a $Br^-$ ion concentration of 2 gm./liter and a reaction time of four minutes during which time the volume of gas produced is measured and recorded. The results are shown graphically in FIG. 2.

For purposes of comparison with a procedure in accordance with the invention, the procedure of Example 1 is repeated except that no $Br^-$ ion catalyst is added. The reaction is run for four minutes during which time the volume of gas produced is measured and recorded. The results are shown graphically in FIG. 2.

Figure 2:
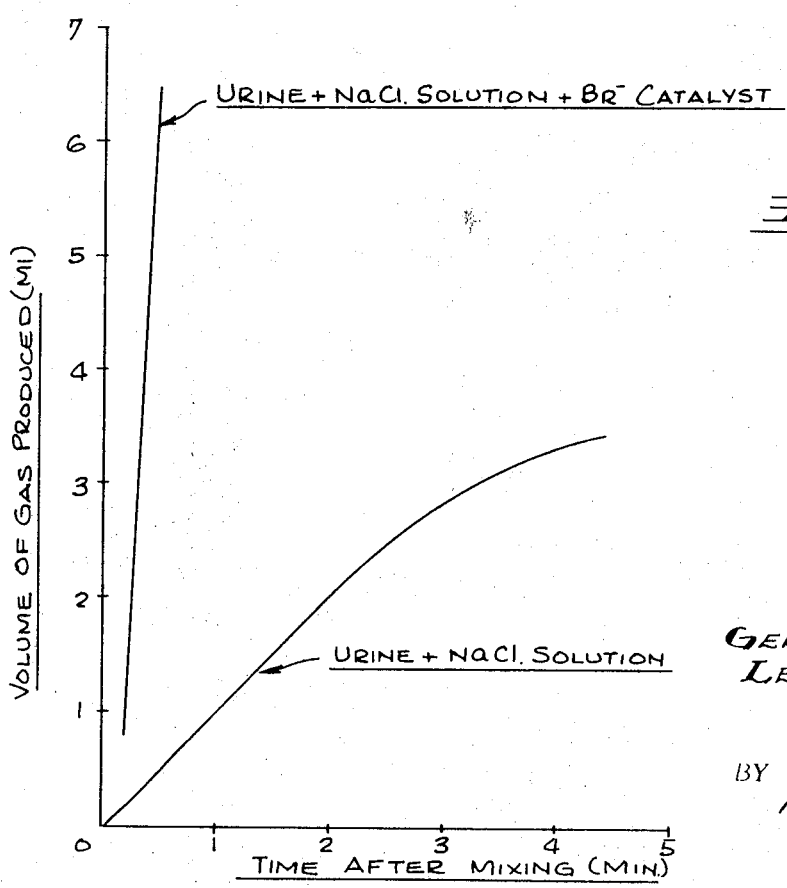
FIG. 2 is a graph showing the comparative volume of gas produced for a specified time by the catalyzed and uncatalyzed electrolysis reaction.

Referring to the graph of FIG. 2, it is seen that the catalyzed reaction is significantly faster than the uncatalyzed reaction. As shown by the graph, almost twice the volume of gas is produced in the bromide ion catalyzed reaction in the first 30 seconds than is produced after 4 minutes of the uncatalyzed reaction.

EXAMPLE 4

Basically the procedure of Example 1 is repeated except that the voltage used is 1.6 volt. The process is found to proceed effectively but more slowly than when the 1.9 volts is used.

EXAMPLE 5

Secondary sewage effluent resulting from sewage which has been treated to settle out the solids and then filtered through and to remove thes solids is flowed into a cell of the type shown in FIG. 1. The NaCl content is found to be 0.1%. Ammonium bromide is added to the secondary effluent in the cell to give an overall concentration of 5% bromide ion. Stirring of the solution is begun and continued throughout the reaction. The cell is operated at 1.9 to 2.0 volts until all of the dissolved organic matter has been decomposed.

EXAMPLE 6

The procedure of Example 5 is repeated except that $MgBr_2$ is used in place of the $NH_4Br$, in an amount to give an overall $Br^-$ ion concentration of 1%.

EXAMPLE 7

Purification of swimming pool water is achieved by flowing the water into a cell of the type shown in FIG. 1. The $Cl^-$ ion concentration found to be .15% is raised to 10% by the addition of $CaCl_2$. Potassium bromide is added to given an overall $Br^-$ ion concentration of .01%. Stirring of the solution is begun and continued throughout the reaction. The cell is operated at 1.9 to 2.0 volts until all of the dissolved organic matter has been decomposed. The process is repeated with additional water until all of the pool water has been purified.

EXAMPLE 8

The procedure of Example 7 is repeated except that no additional $Cl^-$ ion is added.

EXAMPLE 9

Drinking water is purified by flowing the water into a cell of the type shown in FIG. 1. The $Cl^-$ ion concentration is raised to 0.5% by the addition of KCl. Sodium bromide is added to the water to give an overall $Br^-$ ion concentration of .001%. Stirring of the solution is begun and continued throughout the reaction. The cell is operated 1.9–2.0 volts until all of the dissolved organic material has been decomposed and the water is sterilized.

The examples presented above illustrate the invention with respect to specific applications. Various other applications and modifications are contemplated and may be resorted to by those skilled in the art without departing from the spirit and scope of the invention, and hence the invention is not to be taken as limited except by the scope of the appended claims.

We claim:

1. Continuous process for purifying water by electrochemically decomposing water soluble organics in water, comprising flowing water containing dissolved organic material into a direct current electrolysis cell having an anode and cathode in a single compartment, providing a water soluble chloride and adjusting the concentration of $Cl^-$ ion in the water solution within the range of about .010% to about 10% and adding $Br^-$ ion catalyst at the water solution to give a concentration in the range of about .01% to about 10%, continuously stirring the water solution throughout the reaction, and applying a voltage of from about 1.6 volts to about 5 volts to the electrodes for a time sufficient to allow substantially complete electrochemical decomposition of the water soluble organic material in the water.

2. A process as defined in claim 1, wherein said bromide ion is initially in the form of a water soluble salt of a member of the group consisting of the alkali metal, alkaline earth metal, and ammonium salts.

3. A process as defined in claim 1, wherein said chloride ion is initially in the form of a water soluble salt of a member of the group consisting of the alkali metal, alkaline earth metal, and ammonium salts.

4. A process as defined in claim 3, wherein said chloride ion is initially in the form of NaCl.

5. A process as defined in claim 1, wherein said $Br^-$ ion catalyst is added to give a concentration in the range of about .01% to about 1%.

6. A process as defined in claim 1, wherein said $Cl^-$ ion concentration is adjusted in the range of about 0.5% to about 3.5%.

7. A process as defined in claim 2, wherein said $Br^-$ ion catalyst is initially in the form of NaBr.

8. A process as defined in claim 1, wherein said water containing water soluble organics is urine.

9. A process as defined in claim 1, wherein said water containing water soluble organics is swimming pool water.

10. A process as defined in claim 1, wherein said water containing water soluble organics is secondary sewage effluent.

11. A process as defined in claim 1, wherein said water containing water soluble organics is drinking water.

References Cited

UNITED STATES PATENTS

| | | | |
|---|---|---|---|
| Re. 26,329 | 1/1968 | Hougen | 204—149 |
| 398,101 | 2/1889 | Webster, Jr. | 204—149 |

HOWARD S. WILLIAMS, Primary Examiner

A. C. PRESCOTT, Assistant Examiner

U.S. CL. X.R.

204—72